United States Patent
Wang et al.

(10) Patent No.: US 8,442,433 B2
(45) Date of Patent: May 14, 2013

(54) METHOD AND APPARATUS FOR PROVISIONING A DEVICE

(75) Inventors: Feng Wang, Austin, TX (US); Huitao Liu, Round Rock, TX (US)

(73) Assignee: AT&T Intellectual Property I, LP, Atlanta, GA (US)

(*) Notice: Subject to any disclaimer, the term of this patent is extended or adjusted under 35 U.S.C. 154(b) by 913 days.

(21) Appl. No.: 11/093,510

(22) Filed: Mar. 30, 2005

(65) Prior Publication Data
US 2006/0229027 A1    Oct. 12, 2006

(51) Int. Cl.
*H04B 7/00*    (2006.01)
(52) U.S. Cl.
USPC .......... 455/41.2; 235/375; 235/380; 235/385; 235/451; 235/74; 235/379; 235/383; 235/492; 340/5.91; 340/5.92; 340/539.13; 340/572.1; 340/572.8; 340/572.7; 340/10.3; 343/893; 463/40; 400/76; 400/61; 400/70; 455/41.3
(58) Field of Classification Search .......... 455/73, 455/41.2; 340/10.1, 10.3, 5.91, 5.92, 539.13, 340/572.1, 572.8, 572.7; 235/375, 380, 385, 235/451, 74, 379, 383, 492; 343/893; 463/40; 707/104.1, 999.104; 400/76, 61, 70
See application file for complete search history.

(56) References Cited

U.S. PATENT DOCUMENTS

| | | | |
|---|---|---|---|
| 7,084,769 B2* | 8/2006 | Bauer et al. | 340/572.7 |
| 7,219,834 B2* | 5/2007 | Chang | 235/380 |
| 7,221,269 B2* | 5/2007 | Onderko et al. | 340/539.13 |
| 7,416,122 B2* | 8/2008 | Sato | 235/385 |
| 7,422,152 B2* | 9/2008 | Howarth et al. | 235/451 |
| 2002/0191998 A1* | 12/2002 | Cremon et al. | 400/76 |
| 2003/0052161 A1* | 3/2003 | Rakers et al. | 235/375 |
| 2003/0174099 A1* | 9/2003 | Bauer et al. | 343/893 |
| 2004/0212500 A1 | 10/2004 | Stilp | |
| 2004/0214642 A1* | 10/2004 | Beck | 463/40 |
| 2005/0021561 A1* | 1/2005 | Noonan | 707/104.1 |
| 2006/0086786 A1* | 4/2006 | Spencer | 235/380 |
| 2006/0124738 A1* | 6/2006 | Wang et al. | 235/385 |
| 2007/0008129 A1* | 1/2007 | Soliman | 340/572.1 |
| 2007/0159298 A1* | 7/2007 | Zegelin et al. | 340/5.91 |

* cited by examiner

*Primary Examiner* — April G Gonzales
(74) *Attorney, Agent, or Firm* — Guntin & Gust, PLC; Douglas Schnabel

(57) ABSTRACT

An article (100) has a device (122), and a radio frequency identification (RFID) module (102) coupled to the device. The RFID module is programmed to receive (210) provisioning instructions from a wireless source (142), and transfer (212) to the device the provisioning instructions when said device is enabled.

22 Claims, 3 Drawing Sheets

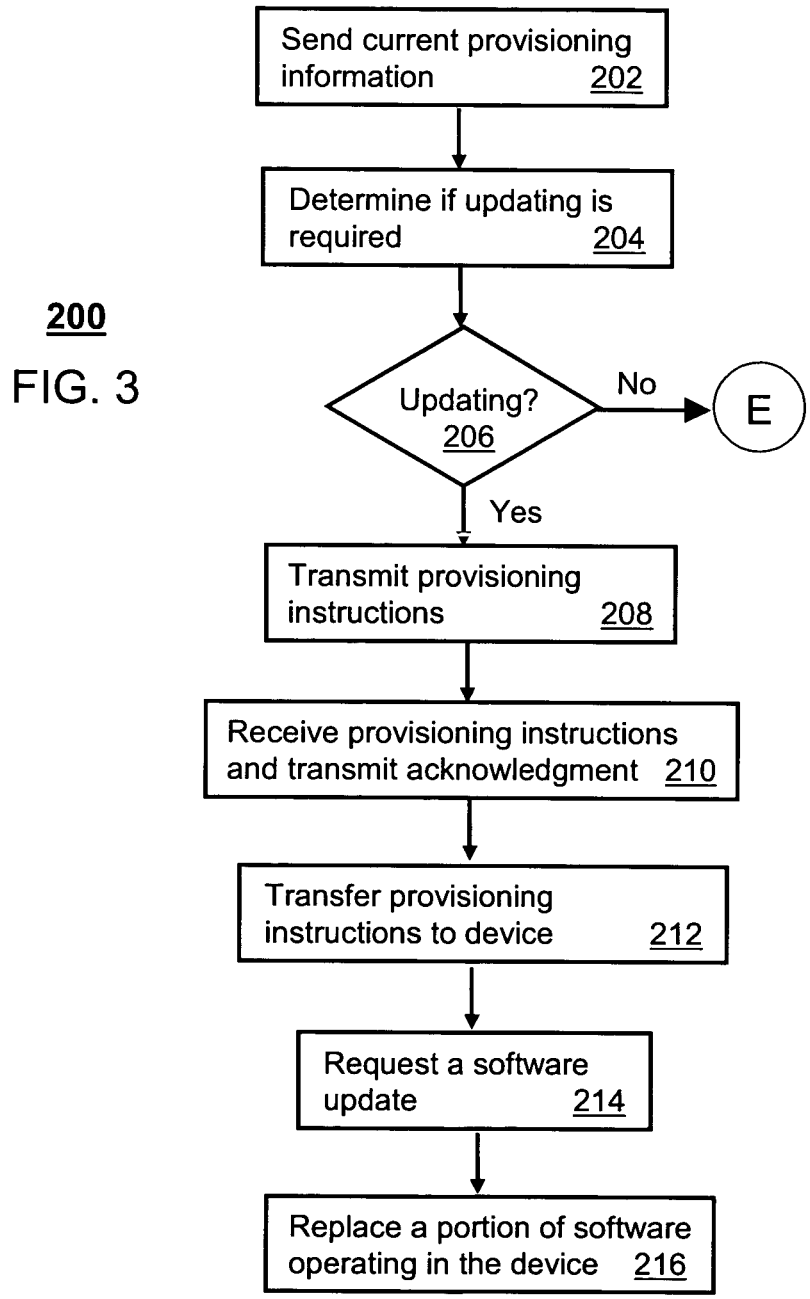

METHOD AND APPARATUS FOR PROVISIONING A DEVICE

FIELD OF THE INVENTION

This invention relates generally to provisioning techniques, and more particularly to a method and apparatus for provisioning a device.

BACKGROUND OF THE INVENTION

Wireless Local Area Network Access Points (WLAN AP) utilizing technology such as IEEE 802.11 a/b/g have been deployed and used widely in enterprises, public places and the home environment. Due to a variety of reasons, however, from the time a WLAN AP is manufactured to the point when it is shipped to a customer, software, firmware and/or other configurable parameters may need to be modified or updated more than once. Need for updating may be due to bug fixing, a new function update, and/or customer configurable settings needing to be updated to account for a change in customer needs.

Today updating is performed by returning such a device to the manufacturer or performing provisioning at a distribution center. This is a very costly consideration for the vendor/manufacturer of the WLAN AP, and may lead to customer dissatisfaction due to late delivery of such devices. This problem can also manifest itself in other configurable devices.

SUMMARY OF THE INVENTION

Embodiments in accordance with the invention provide a method and apparatus for provisioning a device.

In a first embodiment of the present invention, an article has a device, and a radio frequency identification (RFID) module coupled to the device. The RFID module is programmed to receive provisioning instructions from a wireless source, and transfer to the device the provisioning instructions when said device is enabled.

In a second embodiment of the present invention, a method operates in portions of a radio frequency identification (RFID) module, a device coupled to the RFID module, and a wireless source. The method has the steps of receiving at the RFID module provisioning instructions from the wireless source, and transferring from the RFID module to the device the provisioning instructions when said device is enabled.

In a third embodiment of the present invention, portions of a computer-readable storage medium operate in a radio frequency identification (RFID) module, a device coupled to the RFID module, and a wireless source. Portions of the storage medium have computer instructions for receiving at the RFID module provisioning instructions from the wireless source, and transferring from the RFID module to the device the provisioning instructions when said device is enabled.

BRIEF DESCRIPTION OF THE DRAWINGS

FIG. 3 depicts a flow chart of a method operating in portions of the article and the wireless source according to an embodiment of the present invention.

DETAILED DESCRIPTION OF THE DRAWINGS

Figure 1:
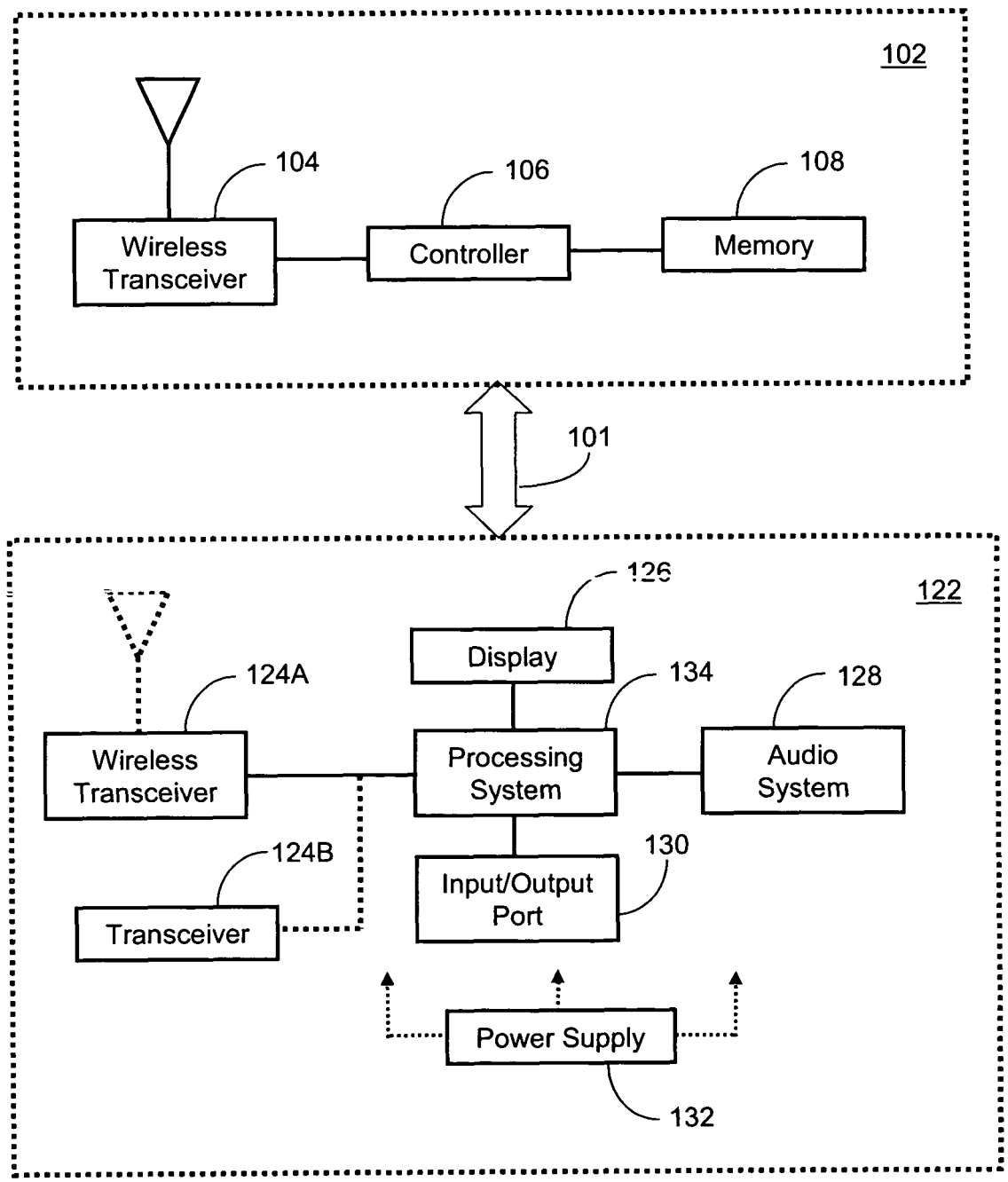
FIG. 1 is block diagram of an article according to an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is block diagram of an article 100 comprising an RFID module 102 coupled to a device 122 according to an embodiment of the present invention. The RFID module 102 comprises conventional technology such as a wireless transceiver 104 for communicating with a wireless source 142 (see FIG. 2), a memory 108 for storing among other things provisioning information, and a controller 106 for controlling operations of the foregoing components. The wireless transceiver 104 operates according to any applicable standard (e.g., ISO/IEC 18000) or proprietary air interface protocol. The memory 108 utilizes conventional non-volatile memory such as Flash memory.

The controller 106 can utilize a conventional microprocessor technology operating with machine instructions from the memory 108 or internal read only memory (ROM) embedded therein. Alternatively, the controller 106 can utilize a conventional hard-coded state machine, which does not require machine instructions. The RFID module 102 can be represented by a conventional passive RFID module powered by the incident RF (Radio Frequency) energy emitted by a wireless source 142, or can be a battery-operated active RFID module powered from its own battery or power supply 132 of the device 122. In the latter embodiment, the active RFID module may have a longer transmission and reception range.

The device 122 can be represented by a number of embodiments including, but not limited to, a computing device, a wireless access point, or a portable device. The computing device can be a conventional desktop or laptop computer, a television set, a VCR, a DVD player, or any other type of appliance having a computing element embedded therein. The wireless access point can be represented by a wireless local area network access point (WLAN AP) operating according to, for example, the IEEE 802.11 a/b/g protocol(s). A portable device can be represented by a cell phone, a personal digital assistant (PDA), a gaming device (e.g., Gameboy™), or like portable unit. It will be appreciated by one of ordinary skill in the art that device 122 can be represented by any embodiment in which said device 122 can be provisioned.

In a first embodiment, the device 122 comprises conventional technology such as a wireless transceiver 124A for exchanging messages with a communication system, a display 126 for conveying images to a user of the device 122, an audio system 128 for conveying audio signals to the user of the device 122, an input/output port 130 (such as, for example, a keypad and/or a serial port), a power supply 132 (battery operated, or conventional outlet) for supplying power to the components of the device 122, and a processing system 134 (such as a microprocessor with associated memory—not shown) for controlling operations of the device 122. Alternatively, the device 122 can also include a wireline transceiver 124B (e.g., Ethernet) for exchanging messages with a communication system (e.g., the Internet).

The foregoing embodiments of the RF module 102 and device 122 can be modified in numerous ways. For example, the RFID module 102 can be designed to share the memory of the processing system 134 of the device 122, which is likely to have substantially more storage capacity. Similarly, the RFID module 102 can share the battery operated power supply of the device 122. It will be appreciated therefore by an artisan with skill in the art that the RF module 102 and the device 122 can be modified in numerous ways while remaining operable within the scope and spirit of the claimed invention.

The device 122 and the RFID module 102 can be coupled together by way of a conventional interface 101. This interface 101 can be a parallel or serial interface. The purpose of the interface 101 is to provide the device 122 access to provisioning instructions stored in the RFID module 102. Said transfer can be performed under the control of the RFID module 102 or the device 122. Thus any means for transferring information between the RFID module 102 and the device 122 is suitable for the present invention.

Figure 2:
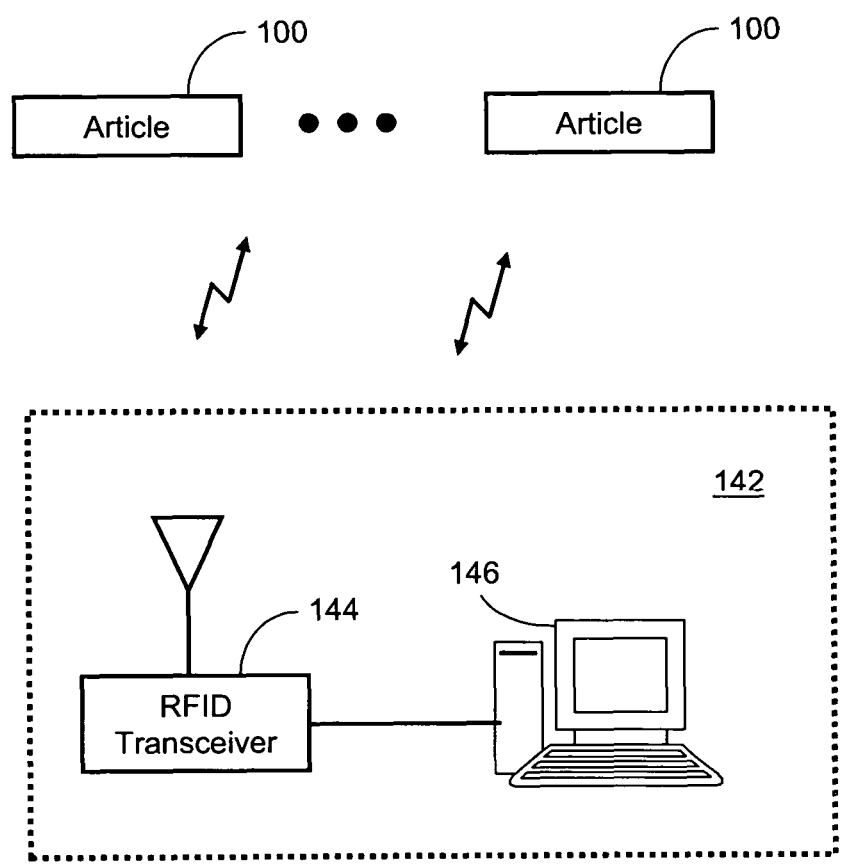
FIG. 2 is block diagram of multiple articles communicating with a wireless source for updating provisioning information therein according to an embodiment of the present invention.

FIG. 2 is block diagram of multiple articles 100 communicating with a wireless source 142 for updating provisioning information therein according to an embodiment of the present invention. The wireless source 142 can utilize conventional technology such as an RFID transceiver 144 conforming to a communication standard such as described above, and a conventional computer 146 for controlling operations thereof. The wireless source 142 can exchange messages with the RFID module 102 of each article 100. Moreover, the wireless source 142 can communicate singly or in parallel with multiple articles 100. The wireless source 142 can be used in a number of applications such as, for example, managing inventory at a distribution center.

FIG. 3 depicts a flow chart of a method 200 operating in portions of the article 100 and the wireless source 142 according to an embodiment of the present invention. Method 200 begins with step 202 wherein the RFID module 102 sends current provisioning information of the device 122 in response to a request from the wireless source 142. The provisioning information can include any number of identifiable components such as, for instance, a serial number of the device 122, current software and/or firmware version number, current operating parameter settings, and customer settings, just to name a few. As discussed earlier, the RFID module 102 can be powered by incidental RF energy received from the wireless source 142, or by way of conventional battery operated means. It is also not necessary for the device 122 to be powered during any of steps 202-210. For example, article 100 can be packaged in a manner whereby device 122 is powered down, while the interchange is taking place between the RFID module 102 and the wireless source 142.

In step 204, the wireless source 142 determines if the current provisioning information described above requires updating. This step can involve the wireless source 142 analyzing a database of inventory items and updates made thereto from its local memory or from a remote database which is accessible by the wireless source 142. Said database can be indexed by the serial number of article 100 or some other identification parameter. If in step 206 the wireless source 142 determines that no updating is required, then method 200 ends by, for example, the RFID module 102 powering down.

On the other hand, if the wireless module 142 determines a portion or all of the provisioning information requires updating, then the wireless source 142 proceeds to step 208 where it transmits provisioning instructions to the RFID module 102. The provisioning instructions can include, but are not limited to, an updated software version number (e.g., 1.X is replaced by 2.X), updated software instructions (e.g., machine code and/or firmware), updated operating parameters (e.g., frequency channel, encryption method, etc.), and/or updated customer settings (e.g., IP address, login and password, etc.). Depending on the storage capacity of the RFID module 102 any or all of the foregoing embodiments of the provisioning instructions can be stored therein. It will be appreciated by one of ordinary skill in the art that other forms of provisioning instructions can similarly be applied to the present invention.

In step 210, the RFID module 102 receives the provisioning instructions and transmits an acknowledgment to the wireless source 142 indicating it has successfully received said instructions. The RFID module 102 at this point stores said instructions in its memory 108 and powers down if no further activities are required. As noted earlier, steps 202-210 can be performed while the device 122 is powered down. This aspect of the invention provides, for example, a very cost effective and convenient means for updating inventory at a distribution center (or other location) carrying numerous articles 100 without ever having to unpackage or resend said articles 100 to the manufacturer.

Once the device 122 has powered up, it proceeds to step 212 where it retrieves the provisioning instructions stored in the memory 108 of the RFID module 102. Alternatively, in step 212 the transfer can be invoked by the RFID module 102. Accordingly, either the RFID module 102 or the device 122 can control the transfer of the provisioning instructions. In step 214, the device 122 can request a software update from a provisioning source (not shown) according to the provisioning instructions.

The provisioning source can be an agent in the process of installing said article 100 at a customer's premises, or a remote server coupled to a communication system such as the Internet for transmitting updated software to the device 122. In the former case, the agent can be carrying a conventional CDROM including the updated software, which can be installed by coupling the device 122 by way of the input/output port 130 with a laptop computer. In the latter case, the device 122 may be capable of communicating with the provisioning source by way of the Internet, which may be accessible wirelessly or by way of wired Ethernet at the customer's premises. Once the updated software has been received, the device 122 can replace in step 216 in whole or in part software operating on the device 122 with the software update. Any conventional means for updating software and/or firmware can be applied in this step.

Alternatively, if the storage capacity of the RFID module 102 is sufficient to store updated software and/or firmware, then step 214 can be removed, and the device 122 can proceed directly to step 216. It will be appreciated that if the provisioning instructions do not change software but rather change customer settings, then step 216 can be modified to perform a simpler updating function. Accordingly, steps 214 and 216 can be modified in any manner sufficient to implement the provisioning instructions provided by the RFID module 102.

It should be evident by now that the present invention can be realized in hardware, software, or a combination of hardware and software. Moreover, the present invention can be realized in a centralized fashion, or in a distributed fashion where different elements are spread across several interconnected processors. Any kind of computing device or other apparatus adapted for carrying out method 200 is suitable for the present invention.

Additionally, the present invention can be embedded in a computer program, which comprises all the features enabling the implementation of method 200, and which when loaded in a computing system is able to carry out these methods as computer instructions. A computer program in the present context means any expression, in any language, code or notation, of a set of instructions intended to cause a system having an information processing capability to perform a particular function either directly or after either or both of the following:

a) conversion to another language, code or notation; b) reproduction in a different material form. It should be also evident that the present invention may be used for many applications. Thus, although the description is made for particular arrangements and methods, the intent and concept of the invention is suitable and applicable to other arrangements and applications not described herein. For example, method 200 can be substantially simplified by removing steps 202 through 206 to account for a case where other methods can be used to determine whether an update is needed. Similarly, the acknowledge transmitted in step 210 can be removed. These and a number of other embodiments are suitable for the present invention. It would be clear therefore to those skilled in the art that modifications to the disclosed embodiments described herein could be effected without departing from the spirit and scope of the invention.

Accordingly, the described embodiments ought to be construed to be merely illustrative of some of the more prominent features and applications of the invention. It should also be understood that the claims are intended to cover the structures described herein as performing the recited function and not only structural equivalents. Therefore, equivalent structures that read on the description should also be construed to be inclusive of the scope of the invention as defined in the following claims. Thus, reference should be made to the following claims, rather than to the foregoing specification, as indicating the scope of the invention.

What is claimed is:

1. An apparatus, comprising:
  a radio frequency identification module physically coupled to a portable device through a direct hardwire interface and being in proximity to the portable device, wherein the radio frequency identification module is programmed to:
    transmit to a wireless source provisioning information of the portable device responsive to a received request from the wireless source;
    receive provisioning instructions from the wireless source when the portable device is disabled, the wireless source being remote from the portable device;
    store the provisioning instructions in a memory of the radio frequency identification module while the portable device is disabled; and
    transfer to the portable device the provisioning instructions upon detecting that the portable device is enabled, wherein the provisioning instructions comprise provisioning data for configuring operation of an electronic component of the portable device; and
  a portable device, wherein the portable device is programmed to:
    receive from a provisioning source by way of a port of the portable device an update of software responsive to receiving from the radio frequency identification module the provisioning instructions; and
    replace at least a portion of previous software stored in the portable device with the update of software.

2. The apparatus of claim 1, wherein the wireless source determines whether the portable device requires updating based on the provisioning information transmitted to the wireless source.

3. The apparatus of claim 1, wherein the portable device is one among an inventory item or an after-market item.

4. The apparatus of claim 1, wherein the radio frequency identification module comprises a controller, a wireless transceiver, a battery, and a memory, and wherein the radio frequency identification module is powered by the battery.

5. The apparatus of claim 1, wherein the radio frequency identification module powers down after storing the provisioning instructions and while the portable device is disabled.

6. The apparatus of claim 5, wherein the provisioning instructions include one among a group of items comprising updated software version, updated software instructions, updated operating parameters, and updated customer settings, and wherein the direct hardwire interface is one among a serial interface or a parallel interface.

7. The apparatus of claim 1, wherein the portable device is programmed to:
  receive the provisioning instructions from the radio frequency identification module; and
  provision itself according to the provisioning instructions.

8. A method comprising:
  transmitting to a wireless source provisioning information of a portable device responsive to a received request from the wireless source;
  receiving provisioning instructions from the wireless source, wherein the provisioning instructions comprising provisioning data for configuring operation of an electronic component of the portable device, and wherein the wireless source communicates by way of an RF transmitter;
  receiving from a provisioning source by way of an internet connection an update of software according to the provisioning instructions: and
  replacing at least a portion of previous software stored in the portable device with the update of software.

9. The method of claim 8, comprising the steps of:
  determining at the wireless source whether the provision information requires updating; and
  transmitting, from the wireless source to a radio frequency identification module, the provisioning instructions if the provisioning information requires updating.

10. The method of claim 8, comprising transferring, from a radio frequency identification module to the portable device, the provisioning instructions by way of communicating the provisioning instructions over a direct hardwire interface between the radio frequency identification module and the portable device.

11. The method of claim 8, wherein a radio frequency identification module receives the provisioning instructions from the wireless source when the portable device is disabled.

12. The method of claim 10, wherein the direct hardwire interface is one among a serial interface and a parallel interface.

13. The method of claim 8, wherein the provisioning instructions include one among a group of items comprising updated software version, updated software instructions, updated operating parameters, and updated customer settings.

14. The method of claim 8, further comprising:
  storing the provisioning instructions in the radio frequency identification module when the portable device is disabled; and
  provisioning the device according to the provisioning instructions.

15. A non-transitory computer-readable storage medium, comprising computer instructions for:
  transmitting, from a radio frequency identification module to a wireless source, provisioning information of a portable device responsive to a received request from the wireless source;
  receiving, at the radio frequency identification module, provisioning instructions from the wireless source when the portable device is disabled, wherein the provisioning instructions comprise provisioning data for configuring operation of an electronic component of the portable device, and wherein the wireless source is remote from the portable device;

transferring from the radio frequency identification module to the portable device the provisioning instructions, wherein the transferring of the provisioning instructions is by way of a direct hardwire interface connecting the radio frequency identification module and the portable device; and receiving from a provisioning source and by way of a port an update of software according to the provisioning instructions; and replacing at least a portion of previous software stored in the portable device with the update of software.

16. The non-transitory storage medium of claim 15, further comprising computer instructions for:

determining at the wireless source whether the provision information requires updating; and transmitting from the wireless source to the radio frequency identification module the provisioning instructions if the provisioning information requires updating, wherein the radio frequency identification module powers down after storing the provisioning instructions and while the portable device is disabled.

17. The non-transitory storage medium of claim 15, comprising computer instructions for:

provisioning the portable device according to the provisioning instructions.

18. The non-transitory storage medium of claim 17, comprising computer instructions for requesting from the portable device a software update from a provisioning source according to the provisioning instructions.

19. An apparatus, comprising:

a radio frequency identification module physically coupled to a portable device, the radio frequency identification module being coupled to the portable device through a direct hardwire interface and being in proximity to the portable device, wherein the radio frequency identification module is programmed to:

transmit, to a wireless source, provisioning information of the portable device responsive to a received request from a wireless source; and receive provisioning instructions from the wireless source that is remote from the portable device; and a portable device, wherein the portable device is programmed to:

receive from a provisioning source by way of an internet connection an update of software responsive to receiving from the radio frequency identification module the provisioning instructions; and replace at least a portion of previous software stored in the portable device with the update of software.

20. The apparatus of claim 19, wherein the wireless source determines whether the provision information requires updating based on the provisioning information transmitted to the wireless source.

21. The apparatus of claim 19, wherein the radio frequency identification module is powered by radio frequency (RF) energy emitted by the wireless source, and wherein the radio frequency identification module receives the provisioning instructions from the wireless source when the portable device is disabled.

22. The apparatus of claim 19, wherein the radio frequency identification module comprises a battery and is powered by said battery.

* * * * *